US009645553B1

(12) United States Patent
Roden, III et al.

(10) Patent No.: US 9,645,553 B1
(45) Date of Patent: May 9, 2017

(54) SECURE TIME REFERENCE USING MULTIPLE TIME SOURCES

(71) Applicant: Raytheon BBN Technologies Corp., Cambridge, MA (US)

(72) Inventors: Thomas Gilbert Roden, III, New Windsor, MD (US); John-Francis Mergen, Baltimore, MD (US)

(73) Assignee: Raytheon BBN Technologies Corp., Cambridge, MA (US)

( * ) Notice: Subject to any disclaimer, the term of this patent is extended or adjusted under 35 U.S.C. 154(b) by 0 days.

(21) Appl. No.: 15/009,019

(22) Filed: Jan. 28, 2016

(51) Int. Cl.
*G04R 20/00* (2013.01)
*G04G 7/00* (2006.01)
*G06F 1/14* (2006.01)
*H04J 3/06* (2006.01)

(52) U.S. Cl.
CPC ............... *G04R 20/00* (2013.01); *G04G 7/00* (2013.01); *G06F 1/14* (2013.01); *H04J 3/0635* (2013.01); *H04J 3/0638* (2013.01)

(58) Field of Classification Search
CPC ... G04R 20/00; G04G 7/00; G06F 1/14; H04J 3/0635; H04J 3/0638
See application file for complete search history.

(56) References Cited

U.S. PATENT DOCUMENTS 5,784,421 A * 7/1998 Dolev .................. H04J 3/0664 370/324
5,796,935 A * 8/1998 Morrison ................ G05B 9/03 714/11
5,822,381 A * 10/1998 Parry .................... H04J 3/0641 375/356
6,714,563 B1 * 3/2004 Kushi .................. H04J 3/0679 370/254
8,666,009 B2 * 3/2014 Lim ...................... H04J 3/0641 368/10
2003/0048811 A1 * 3/2003 Robie, Jr. ............ H04J 3/0667 370/509
2005/0020275 A1 * 1/2005 Agrawala ................ G01S 5/02 455/456.1
2005/0033862 A1 * 2/2005 Blum .................... H04J 3/0664 709/248
2007/0058491 A1 * 3/2007 Dahlen .................... G04G 7/00 368/46
2008/0072097 A1 * 3/2008 Check ...................... G06F 1/14 713/500
2008/0183897 A1 * 7/2008 Carlson ..................... G06F 1/14 709/248
2010/0100761 A1 * 4/2010 Carlson ............... H04L 12/6418 714/4.1

* cited by examiner

*Primary Examiner* — Vit W Miska
(74) *Attorney, Agent, or Firm* — Schwegman Lundberg & Woessner, P.A.

(57) ABSTRACT

Generally discussed herein are systems, apparatuses, and methods for providing an accurate and stable time base. A device can include a voter to receive a plurality of time source values, determine a central time value, and determine which of the plurality of time source values are valid, a deviance checker to determine a deviance set, a discrete time selector to provide a selector identification identifying which of the time source values is selected, and a network interface to provide a time value based on the selected time source value.

20 Claims, 3 Drawing Sheets

SECURE TIME REFERENCE USING MULTIPLE TIME SOURCES

TECHNICAL FIELD

Embodiments discussed herein relate to devices, systems, and methods for providing a secure and/or reliable time reference. In one or more embodiments, a time reference is produced using input from multiple time sources.

BACKGROUND

Having an accurate and reliable clock is important in many use cases. One such use case includes day trading. Day traders rely on fluctuations of stock that occur in small fractions of time to produce valuable investments. If the clock is not accurate, or the clock is non-operational, the day trader can be making trades at the wrong times, thus making the value of the investments inconsistent with the day trader's expectations. Another use case includes a manufacturing facility that relies on precise timing in operating some automation or timing an operation. If the clock is off, component yield can decrease (component loss) can increase due to over exposure or other manufacturing defect. Many other use cases of reliable and accurate clocks exist. In any of the use cases, it is important to have a reliable and accurate clock.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments or examples discussed in the present document.

DETAILED DESCRIPTION

Figure 1:
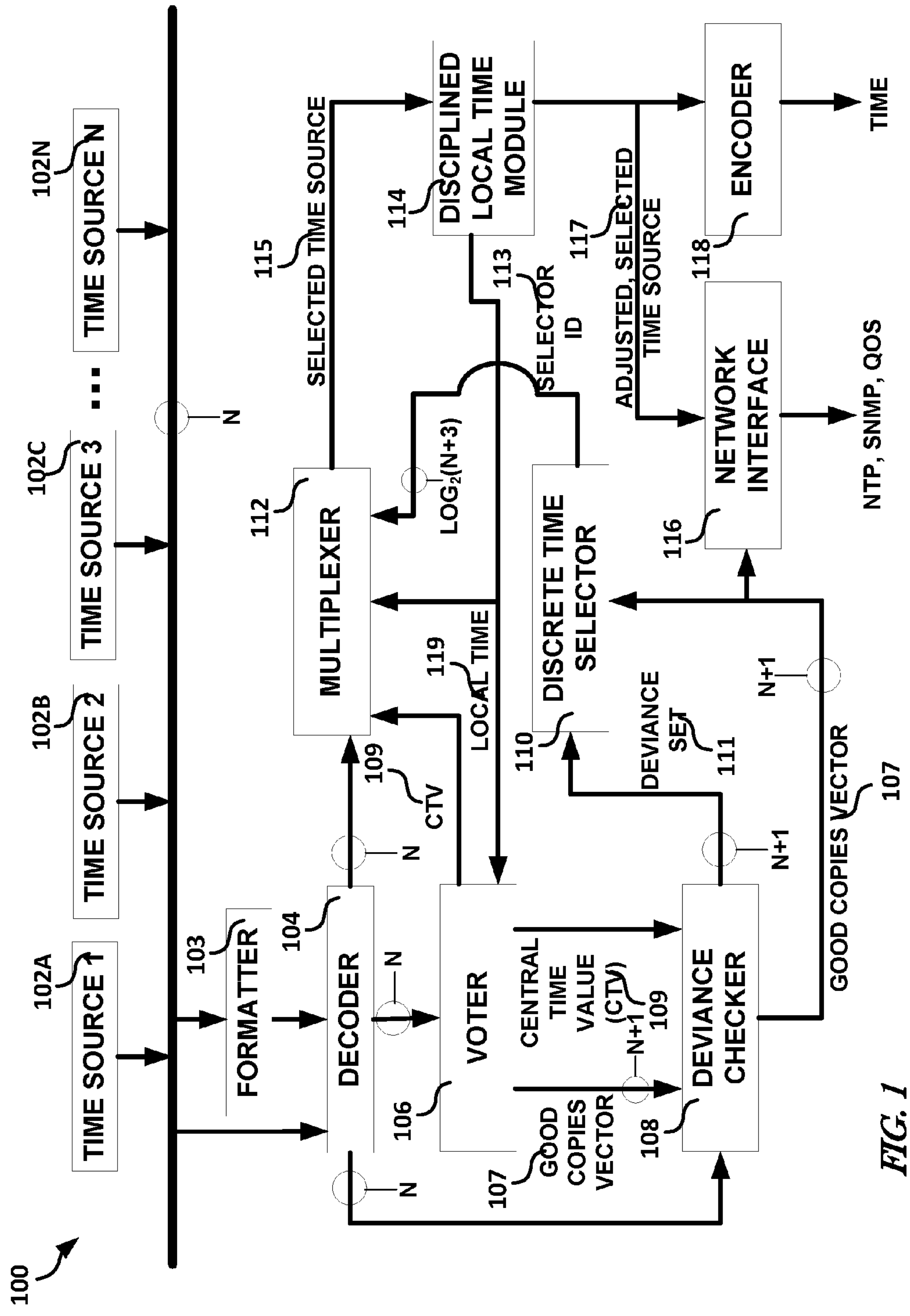
FIG. 1 illustrates, by way of example, a diagram of an embodiment of a system for providing a time reference, in accord with one or more embodiments.

Embodiments discussed herein relate to devices, systems, and methods for providing a secure, reliable, and/or fault tolerant time reference. In one or more embodiments, a time reference is produced using input from multiple time sources.

Embodiments discuss herein can provide a secure, reliable, multi-sourced, stable, and/or fault tolerant time reference. This time reference can be provided even in the presence of natural and/or man-made disruptions, such as power failures, covert attacks, such as by a hacker, power surges, or the like. One or more embodiments include using multiple time sources to generate a time reference output, such as to a network of devices, such as can include a Power Management Unit (PMU), a bank clock, a manufacturing facility clock, a computer, a phone, and so forth.

An accurate and stable clock (time base) is useful in coordinating actions across distances, even if there is no communication path between the entities performing the actions. Systems, apparatuses, and methods discussed herein provides accurate and stable clock(s) by preventing glitches in an output clock when there are cane overs in a time base.

One or more embodiments provide a best available discrete time source (best in terms of some defined heuristic) and/or a voted time source as a reference output. One or more embodiments provide the ability for a user to select a preferred discrete time source. One or more embodiments provide the ability for a user to select failsafe operational behaviors. One or more embodiments includes fault-tolerance techniques to reject one or more faulty time sources.

At a high level, embodiments monitor a set of time sources, such as a global positioning system (GPS) clock, global system for mobile communications (GSM) clock, high definition television (HDTV) clock, or other clock source. The number of time sources is flexible, but as a general rule, the more time sources that are available, the better the system can operate, such as to provide a more reliable, more accurate, and/or more fault-tolerant reference time.

Embodiments discussed herein can be independent of a transmission medium of the time source. The time source inputs can be in a uniform format or converted to a uniform format, such as an inter-range instrumentation group (IRIG) time code (e.g., IRIG-A, IRIG-B, IRIG-D, IRIG-E, IRIG-G, or IRIG-H) format, or other format, such as can be custom or standard. In one or more embodiments, the time input(s) can be range checked, such as to help exclude anomalous time values.

Time values that are determined to be acceptable can be voted, such as to determine a central time value. The acceptable time values can be checked to determine their degree of deviance from the voted central time value. The best discrete time value can be selected as the time value to be used, such as can be based on some heuristic that can include an order of preference (e.g., provided by a user), include the central time value, and/or can include a disciplined local time source value. The central time value can be a mean, median, or mode of one or more of the time values, such as can include time values determined to be valid, invalid, or a combination thereof.

The selected time value can be encoded into a specified format, such as a standard or custom format, and provided as the reference time. A network interface can be connected to a system to provide the time to be used in a network time protocol (NTP). Quality of service (QoS) data regarding the jitter, slew, drift, or other metric of the provided time can be through a network interface, such as by using a simple network management protocol (SNMP).

FIG. 1 illustrates, by way of example, a diagram of an embodiment of a system 100 for providing a time reference, in accord with one or more embodiments. The system 100 as illustrated includes a plurality of time sources 102A, 102B, 102C, and 102N, a decoder 104, a voter 106, a deviance checker 108, a discrete time selector 110, a multiplexer 112, a disciplined local time module 114, a network interface 116, and an encoder 118.

As illustrated, the time sources 102A-N are communicatively coupled to an optional formatter 103. In alternative embodiments, such as embodiments in which the time sources 102A-N provide data in a uniform format, the time sources 102A-N can be directly communicatively coupled to the decoder 104. In some embodiments, one or more time sources 102A-N may already be in a format that can be decoded by the decoder 104. These time sources 102A-N can be provided directly to the decoder 104. In these embodiments, only time sources that are not in a format decodable by the decoder 104 are provided to the formatter 103.

As illustrated, the optional decoder 104 is communicatively coupled to the voter 106, deviance checker 108, and the multiplexer 112. The voter 106 is communicatively coupled to the deviance checker 108, the multiplexer 112, and the disciplined local time 114. The deviance checker 108 is communicatively coupled to the discrete time selector 110 and the network interface 116. The discrete time selector 110 is communicatively coupled to the multiplexer 112. The multiplexer 112 is communicatively coupled to the disciplined local time 114. And the disciplined local time 114 is communicatively coupled to the encoder 118 and the network interface 116. Note that a "communicative coupling" means a coupling capable of providing data to the item. Thus, the voter 106 being communicatively coupled to the deviance checker 108 means that the voter 106 can provide data to the deviance checker 108.

The time sources 102A-N can be from a variety of clock sources. Examples of time sources include GPS, GSM, long range navigation (LORAN) (e.g., LORAN-A, LORAN-B, LORAN-C, or E-LORAN), a digital television clock (e.g., HDTV, digital video broadcasting (DVB), or advanced television systems committee (ATSC) clock), an atomic clock source, a radio clock, an oscillator (e.g., quartz or resistor-capacitor (RC) oscillator) clock, Teletext (TTX), radio data system (RDS) clock, digital radio mondiale (DRM) clock, a digital clock input, or other time source.

Data from each of the time sources 102A-N can be converted to a uniform format, such as an IRIG format, such as by using the formatter 103, or, if they are already in the uniform format, they can be decoded, using the decoder 104. The optional formatter 103 converts time source data from the time sources 102A-N to the uniform format, such as can be decoded by the decoder 104. The decoder 104 receives the data from the formatter 103 or the time sources 102A-N and converts the data to a binary or other representation of an integer time value. In one or more embodiments, the integer time value is a sixty-four or one hundred twenty-eight bit integer that represents time in sub-seconds (e.g., femto, pico, nanoseconds, microseconds, etc.) since a specified date, such as the beginning of the year 2000. The decoder 104 can provide the decoded times to the voter 106, deviance checker 108, and/or the multiplexer 112.

The voter 106 can determine if one or more input time values are anomalies (i.e. invalid). The voter 106 can range check the time source values, such as by comparing the decoded time source values from the decoder 104 to an expected range of time values. The expected range of time values can be based on a disciplined local time from the disciplined local time module 114. If the time source value falls outside of the expected range of time values, the voter 106 can exclude this time source value from consideration, such as by setting a corresponding value in an entry of a good copies vector 107 to indicate the time value is out of the expected range. The expected range of time values can span a delta of values on both sides of a mid-value (i.e. expected range of values=[value−delta, value+delta]). The good copies vector 107 can be an array of values, one for each time source 102A-N, a central time value, and/or a discipline local time 119. An entry in the good copies vector 107 can indicate a corresponding time source 102A-N has an invalid value or a valid value. An invalid time value can be indicated by a zero, negative, not a number, or other entry that indicates the time value is invalid. A value time value can be indicated by a one, positive, or other entry that indicates the time value is valid.

The voter 106 can receive a disciplined local time 119 from the discipline local time module 114. The voter 106 can determine a central time value based on the disciplined local time 119 and/or one or more of the decoded time source values from the decoder 104. Each of the time values used to determine the central time value can include a corresponding entry in the good copies vector 107 indicating the corresponding time value is valid. The voter 106 can provide the central time value 109 to the deviance checker 108 and the multiplexer 112. The central time value 109 can be a mean, weighted mean, median, or mode of one or more of the time values, such as can include time values determined to be valid, invalid, or a combination thereof. In determining a weighted mean of the time source values, each time source value can be multiplied by a weight. The weight can be determined based on a history of the time source value being valid and/or invalid. For example, a time source value that is often selected as the time source value provided to the network can include a weight that is greater than a time source that is rarely or never selected as the time source value provided to the network.

The voter 106 can provide the good copies vector 107 to the deviance checker 108. As previously discussed, the good copies vector 107 includes entries that indicate which time values were used to determine the central time value 109. In one or more embodiments, the good copies vector 107 includes an entry for each of the time source values including the disciplined local time 119 (for a total of N+1 entries (as indicated by the "N+1"), assuming N time source values other than the disciplined local time 119). In one or more embodiments, the good copies vector 107 includes only entries for time source values received from the decoder 104 that are within the expected time range (for a maximum of N entries).

The deviance checker 108 compares the input time source values to the determined central time value 109 and produces a deviance set 111 based on the comparison. The deviance set 111 includes a plurality of deviance values, such as in an array arranged such that the each entry matches with a corresponding entry in the good copies vector 107. Each of the deviance values can be a difference (e.g., an absolute value of a difference) between a time source value and the determined central time value 109. The deviance checker 108 can provide the deviance set 111 and the good copies vector 107 to the discrete time selector 110. The deviance checker 108 can provide the good copies vector 107 to the network interface 116. Alternatively, the good copies vector 107 can be provided to the discrete time selector 110 and the network interface 116 by the voter 106.

The discrete time selector 110 uses the good copies vector 107, the deviance set 111, and configurable deviance limits to output a selector identification (ID) 113 of the selected time source value. The selector ID 113 indicates a position in an array of time source values (e.g., an array with entries corresponding to, for example, [time source 1 value, time source 2 value, time source 3 value, . . . time source N value, local time]). This position can correspond to the time source value's selection ID 113 as used by the multiplexer 112. The discrete time selector 110 can choose the selector ID 113 based on one or more heuristics. Examples of heuristics include: always selecting the central time value, prioritizing the clocks based on user preferences and choosing the time source value that is associated with the highest preference and includes a sufficiently low deviance value and an entry in the deviance set that indicates the time source value is valid, multiplying each of the deviances by a preference value and choosing the time source associated with the lowest result after the multiplication, selecting a preferred time source value unless it deviates from the central time value by a threshold amount else selecting the time source associated with the central time value, among other heuristics.

The multiplexer 112 takes the selector ID 113, central time value 109, time source values (from the decoder 104), and the disciplined local time 119 as inputs, and provides the time source value associated with the selector ID 113 to the disciplined local time module 114, network interface 116, and/or the encoder 118.

The disciplined local time module 114 takes the selected time source as an input and produces a local time 119 as an output. The local time 119 is sometimes referred to as a disciplined local time. Disciplined because it is adjusted, such as by a phase locked loop, based on the selected time source value.

The disciplined local time module 114 includes a time source value counter that increments every sub-second interval (e.g., femtosecond, picosecond, nanosecond, microsecond, etc.). The local time 119, in one or more embodiments, can be a 64, 128, or 256 bit integer indicating the number of sub-second intervals that have elapsed since some specified time (e.g., the beginning of the year 2000). The local time 119 can be used to timestamp time source inputs values with time of arrival, such as by the decoder 104.

The local time 119 can be used to remove time skew from the selected time source value. Consider a system in which the time it takes for the time source value 102A-N to be received at the formatter 103 or decoder 104 to the time it is provided to the network interface 116 and/or the encoder 118 is a microsecond. The microsecond lag will be evident in the selected time source 115. The timestamp from the selected time source can be compared to the local time 119 to determine the lag in the system 100. The disciplined local time module 114 can compensate the selected time source 115 value by the known lag time before providing the time source value to the network interface 116 and/or the encoder 118. This adjusted time source value is indicated as an adjusted, selected time source 117.

The disciplined local time 119, as produced by the disciplined local time module 114, can be used as a time source, and can even be selected as the time source value. This is particularly helpful when there is no time source value with a corresponding valid indication in the good copies vector, or there is some form of irresolvable conflict in choosing a time source value.

The network interface 116 can provide the time source value 117, such as via NTP. The network interface 116 can provide QoS data to one or more users, such as operators of the clocks or devices that rely on the clocks. The QoS data can include the deviance from the central time value (i.e. from the deviance set), jitter, skew, drift, accuracy (to within a number of sub-seconds), or the like.

The encoder 118 can format the time source value into a different format, such as a standard format. The standard format can be an IRIG format, for example.

Figure 2:
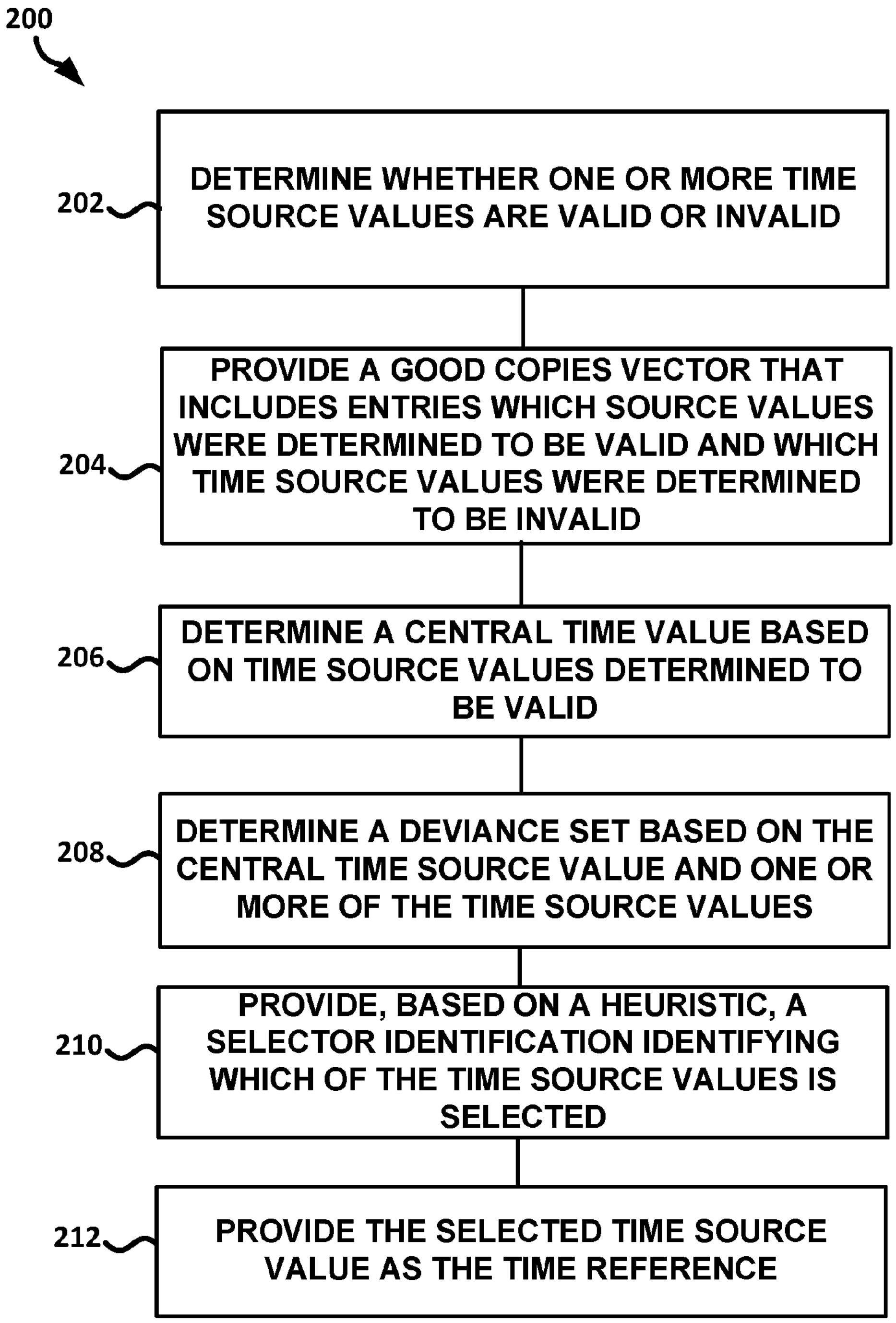
FIG. 2 illustrates, by way of example, a method for providing a time reference, in accord with one or more embodiments.

FIG. 2 illustrates, by way of example, a method 200 for providing a time reference, in accord with one or more embodiments. The method 200 as illustrated includes determining whether one or more time source values of a plurality of time source values are valid and discarding any time source values that are not determined to be valid, at operation 202; providing a good copies vector that includes entries indicating all time source values determined to be valid, at optional operation 204; determining a central time value based on time source values determined to be valid, at operation 206; determining a deviance set, the deviance set including a difference value between each of the time source values in a time source values vector (e.g., from the decoder 104) and the central time value, at operation 208; providing, based on a heuristic, a selector identification identifying which of the time source values is selected, at operation 210; and providing the selected time source value as the time reference, at operation 212.

The method 200 can further include incrementing a local time value every sub-second to produce a local time. The method 200 can further include adjusting the selected time source value for skew. The method 200 can further include disciplining the local time value based on the selected time source value. The wherein the time reference can be the selected time source value adjusted for skew.

The operation 202 can include determining a difference between the plurality of time source values and the disciplined local time. The method 200 can further include producing the time source values, such as by decoding time source data from a plurality of time sources, the time source values including one of a 64 bit and 128 bit integer representing a number of sub-seconds that have elapsed since a specified time. The time source values can be derived from a plurality of time sources including two or more of a global positioning system clock, a global system for mobile communications (GSM) clock, a long range navigation (LORAN) clock, and a high definition television clock.

The method 200 can further include encoding the selected time source value (e.g., adjusted for skew) to produce a formatted time source value. The method 200 can further include receiving the time source values, the central time value, the disciplined local time, and the selector identification at a multiplexer and providing, by the multiplexer, the selected time source value based on the selector identification, the selected time source value including one of a time source value of the plurality of time source values, the central time value, and the disciplined local time.

The method 200 can further include providing quality of service data, such as by a network interface, the quality of service data including one or more of a clock jitter, skew, drift, and difference from the central time value. The operation 206 can include using the disciplined local time in determining the central time value. The heuristic of the method 200 can include one or more of: multiplying or dividing a deviance value by a preference value provided by a user to produce a resultant metric for each of the time value sources corresponding to valid entries in the good values vector and the selector identification corresponds to the resultant metric with the lowest or highest value, always selecting the central time value, prioritizing the clocks based on user preferences and choosing the time source value with a corresponding valid entry in the good copies vector that is associated with the highest preference, multiplying each of the deviances by a preference value and choosing the time source associated with the lowest result after the multiplication, and selecting a preferred time source value unless it deviates from the central time by a threshold amount else selecting the time source associated with the central time value, among other heuristics.

Figure 3:
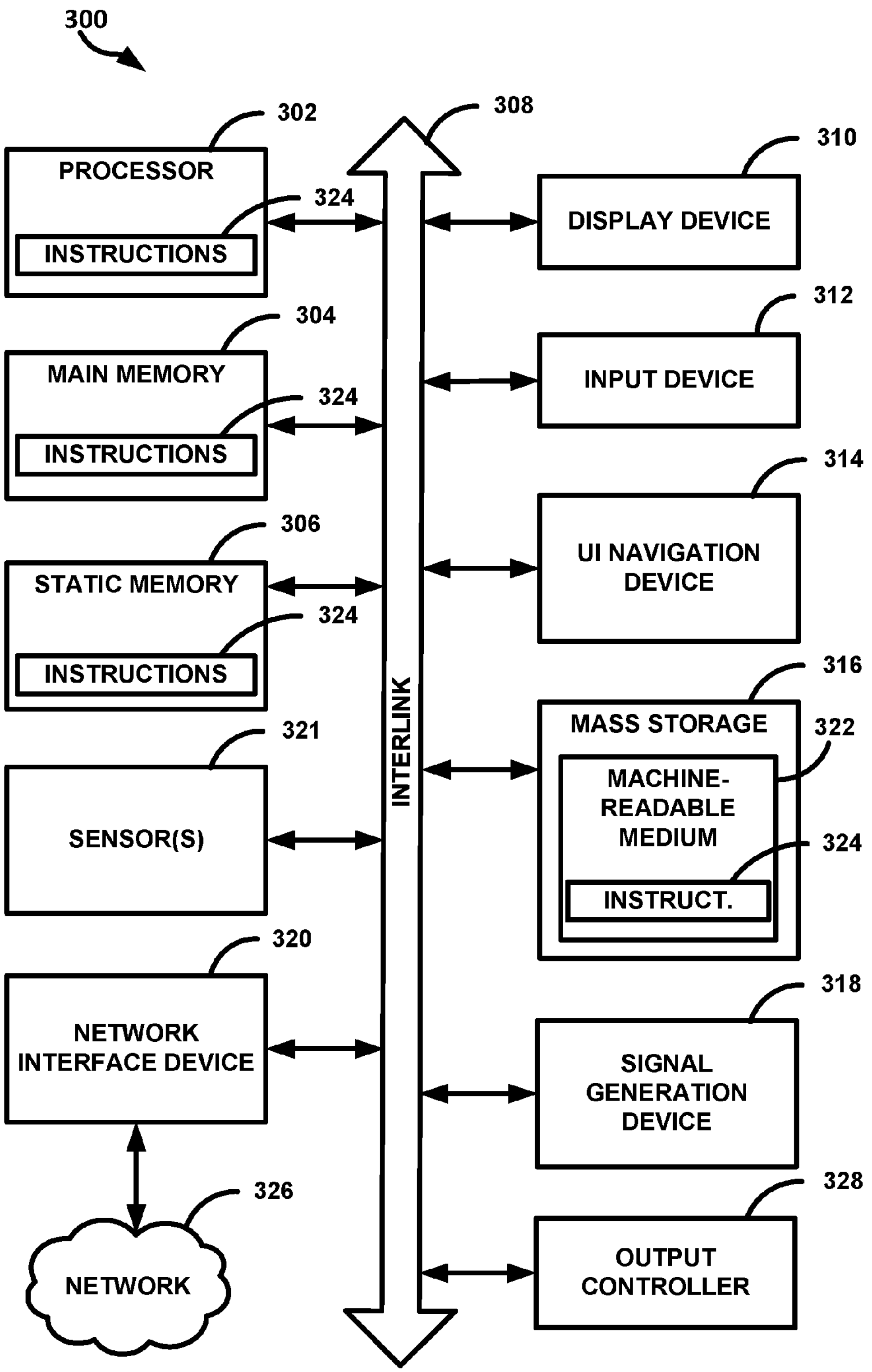
FIG. 3 illustrates, by way of example, a block diagram of an embodiment of a machine on which one or more of the methods as discussed herein can be implemented.

FIG. 3 illustrates, by way of example, a block diagram of an embodiment of a machine 300 on which one or more of the methods as discussed herein can be implemented. In one or more embodiments, one or more items of the system 100 can be implemented by the machine 300. In alternative embodiments, the machine 300 operates as a standalone device or may be connected (e.g., networked) to other machines. In one or more embodiments, the time source 102A-N, the formatter 103, the decoder 104, the voter 106, the deviance checker 108, the discrete time selector 110, the multiplexer 112, the disciplined local time module 114, the network interface 116, and/or the encoder 118 includes one or more of the items of the machine 300. In a networked deployment, the machine 300 may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example machine 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The machine 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software) 324 embodying or utilized by any one or more of the methodologies or functions described herein. The instructions 324 may also reside, completely or at least partially, within the main memory 304 and/or within the processor 302 during execution thereof by the computer system 300, the main memory 304 and the processor 302 also constituting machine-readable media.

While the machine-readable medium 322 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 324 may further be transmitted or received over a communications network 326 using a transmission medium. The instructions 324 may be transmitted using the network interface device 320 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Examples and Additional Notes

Example 1 can include or use subject matter (such as an apparatus, a method, a means for performing operations, or a machine readable memory including instructions that, when performed by the machine, can configure the machine to perform acts), such as can include or use a system for providing a reliable time comprising a voter to determine a central time value based on a plurality of time source values and produce data indicating which time source values, if any, are determined to be valid and data indicating which time source values, if any, are determined to be invalid, a deviance checker to determine a deviance set based on one or more of the time source values and the central time value, a discrete time selector to, based on a heuristic and the deviance set, provide a selector identification identifying which of the time source values is selected, and a network interface to provide a time value based on the selected time source value.

Example 2 can include or use, or can optionally be combined with the subject matter of Example 1 to include or use, a disciplined local time module to increment a local time value every sub-second, receive the selected time source value, adjust the selected time source value for skew, and discipline the local time value based on the selected time source value adjusted for skew, and wherein the time value provided by the network interface is the selected time source value adjusted for skew.

Example 3 can include or use, or can optionally be combined with the subject matter of Example 2 to include or use, wherein the voter is further to receive the disciplined local time, wherein the determination of which of the plurality of time source values is valid includes determining a difference between the plurality of time source values and the disciplined local time, and wherein the data indicating which time source values, if any, are determined to be valid and data indicating which time source values, if any, are determined to be invalid includes a good copies vector including an entry corresponding to each time source value, each entry indicating if the corresponding time source value is valid or invalid.

Example 4 can include or use, or can optionally be combined with the subject matter of at least one of Examples 1-3 to include or use a decoder to receive formatted time source values and produce the time source values based on the formatted time source values, the time source values including one of a 64 bit and 128 bit integer representing a number of sub-seconds that have elapsed since a specified time.

Example 5 can include or use, or can optionally be combined with the subject matter of at least one of Examples 1-4 to include or use an encoder to receive the selected time source value adjusted for skew and produce a formatted time source value.

Example 6 can include or use, or can optionally be combined with the subject matter of at least one of Examples 1-5 to include or use a multiplexer to receive the time source values, the central time value, the disciplined local time, and the selector identification and provide the selected time source value based on the selector identification, the selected time source value including one of a time source value of the plurality of time source values, the central time value, and the disciplined local time.

Example 7 can include or use, or can optionally be combined with the subject matter of at least one of Examples 1-5 to include or use, wherein the network interface is further to provide quality of service data, the quality of service data including one or more of a clock jitter, skew, drift, and difference from the central time value.

Example 8 can include or use, or can optionally be combined with the subject matter of at least one of Examples 2-7 to include or use, wherein the voter further uses the disciplined local time in determining the central time value.

Example 9 can include or use, or can optionally be combined with the subject matter of at least one of Examples 1-8 to include or use a plurality of time sources to provide the time source values, the plurality of time sources including two or more of a global positioning system clock, a global system for mobile communications (GSM) clock, a long range navigation (LORAN) clock, and a high definition television clock.

Example 10 can include or use, or can optionally be combined with the subject matter of at least one of Examples 1-9 to include or use, wherein the heuristic includes always selecting the central time value as determined by the voter, wherein the central time value is a median time source value, and wherein the deviance set includes a difference value between valid time source values and the central time value.

Example 11 can include or use subject matter (such as an apparatus, a method, a means for performing operations, or a machine readable memory including instructions that, when performed by the machine, can configure the machine to perform acts), such as can include or use determining whether one or more time source values of a plurality of time source values are valid or invalid, determining a central time value based on time source values determined to be valid time source values, determining a deviance set based on the central time value and one or more of the time source values, providing, based on a heuristic, a selector identification identifying which of the time source values is selected, and providing the selected time source value as the time reference.

Example 12 can include or use, or can optionally be combined with the subject matter of Example 11 to include or use incrementing a local time value every sub-second, adjusting the selected time source value for skew, disciplining the local time value based on the selected time source value, and wherein the time reference is the selected time source value adjusted for skew.

Example 13 can include or use, or can optionally be combined with the subject matter of Example 12 to include or use, wherein determining which of the plurality of time source values is valid includes determining a difference between the plurality of time source values and the disciplined local time and the method further comprises providing a good copies vector that includes entries indicating which of the time source values are determined to be valid and which of the time source values are determined to be invalid.

Example 14 can include or use, or can optionally be combined with the subject matter of at least one of Examples 12-13 to include or use producing the time source values, the time source values including one of a 64 bit and 128 bit integer representing a number of sub-seconds that have elapsed since a specified time.

Example 15 can include or use, or can optionally be combined with the subject matter of at least one of Examples 12-14 to include or use, wherein the time source values are derived from plurality of time sources including two or more of a global positioning system clock, a global system for mobile communications (GSM) clock, a long range navigation (LORAN) clock, and a high definition television clock.

Example 16 can include or use subject matter (such as an apparatus, a method, a means for performing operations, or a machine readable memory including instructions that, when performed by the machine, can configure the machine to perform acts), such as can include or use receiving a plurality of time source values, determining whether one or more time source values of the plurality of time source values are valid or invalid, determining a central time value based on time source values corresponding to valid time source values, determining a deviance set based on the central time value and one or more of the time source values, providing, based on a heuristic, a selector identification identifying which of the time source values is selected, and providing the selected time source value as the time reference.

Example 17 can include or use, or can optionally be combined with the subject matter of Example 16 to include or use incrementing a local time value every sub-second, adjusting the selected time source value for skew, disciplining the local time value based on the selected time source value, and wherein the time reference is the selected time source value adjusted for skew.

Example 18 can include or use, or can optionally be combined with the subject matter of at least one of Examples 16-17 to include or use, wherein the instructions for determining which of the plurality of time source values is valid include instructions for determining a difference between the plurality of time source values and the disciplined local time.

Example 19 can include or use, or can optionally be combined with the subject matter of at least one of Examples 16-18 to include or use producing the time source values based on uniformly formatted time source data, the time source values including one of a 64 bit and 128 bit integer representing a number of sub-seconds that have elapsed since a specified time.

Example 20 can include or use, or can optionally be combined with the subject matter of at least one of Examples 16-17 to include or use determining the central time value include instruction for using the disciplined local time in determining a median value based on the valid time source values.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A system for providing a reliable time comprising:

a voter to determine a central time value based on a plurality of time source values and produce data indicating which time source values, if any, are determined to be valid and data indicating which time source values, if any, are determined to be invalid;

a deviance checker to determine a deviance set based on one or more of the time source values and the central time value;

a discrete time selector to, based on a heuristic and the deviance set, provide a selector identification identifying which of the time source values is selected; and a network interface to provide a time value based on the selected time source value.

2. The system of claim 1, further comprising:

a disciplined local time module to increment a local time value every sub-second, receive the selected time source value, adjust the selected time source value for skew, and discipline the local time value based on the selected time source value adjusted for skew, and wherein the time value provided by the network interface is the selected time source value adjusted for skew.

3. The system of claim 2, wherein the voter is further to receive the disciplined local time, wherein the determination of which of the plurality of time source values is valid includes determining a difference between the plurality of time source values and the disciplined local time, and wherein the data indicating which time source values, if any, are determined to be valid and data indicating which time source values, if any, are determined to be invalid includes a good copies vector including an entry corresponding to each time source value, each entry indicating if the corresponding time source value is valid or invalid.

4. The system of claim 3, further comprising a decoder to receive formatted time source values and produce the time source values based on the formatted time source values, the time source values including one of a 64 bit and 128 bit integer representing a number of sub-seconds that have elapsed since a specified time.

5. The system of claim 4, further comprising an encoder to receive the selected time source value adjusted for skew and produce a formatted time source value.

6. The system of claim 5, further comprising a multiplexer to receive the time source values, the central time value, the disciplined local time, and the selector identification and provide the selected time source value based on the selector identification, the selected time source value including one of a time source value of the plurality of time source values, the central time value, and the disciplined local time.

7. The system of claim 6, wherein the network interface is further to provide quality of service data, the quality of service data including one or more of a clock jitter, skew, drift, and difference from the central time value.

8. The system of claim 6, wherein the voter further uses the disciplined local time in determining the central time value.

9. The system of claim 7, further comprising a plurality of time sources to provide the time source values, the plurality of time sources including two or more of a global positioning system clock, a global system for mobile communications (GSM) clock, a long range navigation (LORAN) clock, and a high definition television clock.

10. The system of claim 9, wherein the heuristic includes always selecting the central time value as determined by the voter, wherein the central time value is a median time source value, and wherein the deviance set includes a difference value between valid time source values and the central time value.

11. A method for providing a time reference comprising:

determining whether one or more time source values of a plurality of time source values are valid or invalid;

determining a central time value based on time source values determined to be valid time source values;

determining a deviance set based on the central time value and one or more of the time source values;

providing, based on a heuristic, a selector identification identifying which of the time source values is selected; and providing the selected time source value as the time reference.

12. The method of claim 11, further comprising:

incrementing a local time value every sub-second;

adjusting the selected time source value for skew;

disciplining the local time value based on the selected time source value, and wherein the time reference is the selected time source value adjusted for skew.

13. The method of claim 12, wherein determining which of the plurality of time source values is valid includes determining a difference between the plurality of time source values and the disciplined local time and the method further comprises providing a good copies vector that includes entries indicating which of the time source values are determined to be valid and which of the time source values are determined to be invalid.

14. The method of claim 13, further comprising producing the time source values, the time source values including one of a 64 bit and 128 bit integer representing a number of sub-seconds that have elapsed since a specified time.

15. The method of claim 14, wherein the time source values are derived from plurality of time sources including two or more of a global positioning system clock, a global system for mobile communications (GSM) clock, a long range navigation (LORAN) clock, and a high definition television clock.

16. A non-transitory machine-readable storage device including instructions stored thereon which, when executed by the machine, cause the machine to perform operations for providing a time reference, the operations comprising:

receiving a plurality of time source values, determining whether one or more time source values of the plurality of time source values are valid or invalid;

determining a central time value based on time source values corresponding to valid time source values;

determining a deviance set based on the central time value and one or more of the time source values;

providing, based on a heuristic, a selector identification identifying which of the time source values is selected; and providing the selected time source value as the time reference.

17. The storage device of claim 16, further comprising instructions which, when executed by the machine, configure the machine to perform operations comprising:

incrementing a local time value every sub-second;

adjusting the selected time source value for skew;

disciplining the local time value based on the selected time source value, and wherein the time reference is the selected time source value adjusted for skew.

18. The storage device of claim 17, wherein the instructions for determining which of the plurality of time source values is valid include instructions for determining a difference between the plurality of time source values and the disciplined local time.

19. The storage device of claim 18, further comprising instructions which, when executed by the machine, configure the machine to perform operations comprising producing the time source values based on uniformly formatted time source data, the time source values including one of a 64 bit and 128 bit integer representing a number of sub-seconds that have elapsed since a specified time.

20. The storage device of claim 19, wherein the instructions for determining the central time value include instruction for using the disciplined local time in determining a median value based on the valid time source values.

* * * * *